US011948707B2

(12) United States Patent
McGovern et al.

(10) Patent No.: US 11,948,707 B2
(45) Date of Patent: Apr. 2, 2024

(54) ARMORED CABLE WITH INTEGRAL SUPPORT

(71) Applicant: Southwire Company, LLC, Carrollton, GA (US)

(72) Inventors: Kyle Douglas McGovern, Temecula, CA (US); Richard M. Temblador, Carrollton, GA (US); David Mercier, Carrollton, GA (US); John Armstrong, Carrollton, GA (US); Paul H. White, Carrollton, GA (US); Randy D. Kummer, Villa Rica, GA (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

(21) Appl. No.: 15/161,349

(22) Filed: May 23, 2016

(65) Prior Publication Data

US 2016/0268020 A1 Sep. 15, 2016

Related U.S. Application Data

(63) Continuation of application No. 14/187,596, filed on Feb. 24, 2014, now Pat. No. 9,396,838, which is a (Continued)

(51) Int. Cl.
*H01B 9/02* (2006.01)
*H01B 3/30* (2006.01)
(Continued)

(52) U.S. Cl.
CPC ............. *H01B 9/028* (2013.01); *H01B 3/305* (2013.01); *H01B 3/307* (2013.01); *H01B 3/443* (2013.01);
(Continued)

(58) Field of Classification Search
CPC ........ H01B 7/0009; H01B 7/184; H01B 7/04; H01B 7/1895; H01B 9/028; H01B 9/023;
(Continued)

(56) References Cited

U.S. PATENT DOCUMENTS

| | | | |
|---|---|---|---|
| 1,687,013 | A | 10/1928 | Frederickson |
| 1,788,483 | A | 1/1931 | Frederickson |

(Continued)

FOREIGN PATENT DOCUMENTS

| | | |
|---|---|---|
| CA | 525826 | 6/1956 |
| CN | 2067451 U | 12/1990 |

(Continued)

OTHER PUBLICATIONS

Carmin J. Scotti, Literature Search Report, Dec. 19, 2005, 38 pages.

(Continued)

*Primary Examiner* — Jeffrey T Carley
(74) *Attorney, Agent, or Firm* — Merchant & Gould P.C.

(57) ABSTRACT

A system for providing cable support may be provided. The system may comprise a conductor core, a filler that may provide integral core support, and armor. The conductor core may comprise at least one conductor. The filler may be applied around at least a portion of the conductor core. The armor may be applied around at least a portion of the filler. The applied armor may be configured to cause the filler to apply a strong enough force on an exterior of the conductor core configured to keep the conductor core from slipping down an interior of the filler due to a gravitational force. In addition, the applied armor may be configured to cause the filler to apply a strong enough force on an interior of the armor configured to keep a combination of the conductor core and the filler from slipping down the interior of the armor due to the gravitational force.

12 Claims, 5 Drawing Sheets

Related U.S. Application Data continuation of application No. 12/814,595, filed on Jun. 14, 2010, now Pat. No. 8,697,996, which is a continuation of application No. 12/046,488, filed on Mar. 12, 2008, now Pat. No. 7,754,969.

(60) Provisional application No. 60/942,727, filed on Jun. 8, 2007.

(51) Int. Cl.

*H01B 3/44* (2006.01)
*H01B 7/00* (2006.01)
*H01B 7/02* (2006.01)
*H01B 7/18* (2006.01)
*H01B 13/00* (2006.01)
*H01B 13/26* (2006.01)
*H01B 7/04* (2006.01)

(52) U.S. Cl.

CPC ............. *H01B 7/0009* (2013.01); *H01B 7/02* (2013.01); *H01B 7/184* (2013.01); *H01B 9/023* (2013.01); *H01B 13/0036* (2013.01); *H01B 13/26* (2013.01); *H01B 7/04* (2013.01); *H01B 7/1895* (2013.01)

(58) Field of Classification Search

CPC .. H01B 11/183; H01B 11/1834; H01B 3/305; H01B 3/307; H01B 3/443; H01B 7/02; H01B 13/0036; H01B 13/26; Y10T 29/49117; Y10T 29/49123

See application file for complete search history.

(56) References Cited

U.S. PATENT DOCUMENTS 1,995,407 A 3/1935 Walker
2,258,687 A 10/1941 Peterson
2,308,274 A 1/1943 Frederickson
2,446,387 A * 8/1948 Peterson .................. H01B 9/02 174/105 SC
2,866,843 A 12/1958 Arman
3,023,267 A * 2/1962 Eager, Jr. ............... H01B 9/003 174/115
3,032,604 A 5/1962 Timmons
3,047,652 A * 7/1962 Ege .......................... H02G 1/08 174/102 R
3,573,976 A * 4/1971 Duane ................ H01B 11/1834 427/118
3,600,500 A 8/1971 Schoemer et al.
3,660,592 A 5/1972 Anderson
3,673,315 A * 6/1972 Lasley ................... H01B 9/022 174/107
3,829,603 A 8/1974 Hansen et al.
4,081,602 A * 3/1978 Paniri ...................... H01B 7/04 174/103
RE30,194 E 1/1980 Bruno et al.
4,273,806 A 6/1981 Stechler
4,332,976 A * 6/1982 Hawkins ............ H01B 11/1834 174/102 R
4,368,350 A 1/1983 Perelman
4,368,613 A 1/1983 Sanchez
4,374,299 A 2/1983 Kincaid
4,440,973 A * 4/1984 Hawkins ............ H01B 11/1834 156/56
4,510,346 A 4/1985 Bursch, Jr. et al.
4,552,432 A * 11/1985 Anderson ............ G02B 6/4416 174/106 R
4,572,926 A * 2/1986 Ganssle ................... H01B 7/18 174/109
4,859,024 A * 8/1989 Rahman ............... G02B 6/4439 385/112
4,956,523 A * 9/1990 Pawluk .................. H01B 7/184 174/107
5,191,173 A 3/1993 Sizer et al.
5,192,834 A 3/1993 Yamanishi et al.
5,212,350 A 5/1993 Gebs
5,218,167 A 6/1993 Gasque, Jr.
5,329,065 A 7/1994 Marney et al.
5,350,885 A * 9/1994 Falciglia ................ H01B 7/365 156/50
5,416,268 A 5/1995 Ellis
5,416,269 A * 5/1995 Kemp .................... H01B 7/186 174/36
5,597,981 A * 1/1997 Hinoshita ............. H01B 7/295 174/110 PM
5,672,640 A 9/1997 Brauer
5,777,271 A * 7/1998 Carlson .................. H01B 7/202 174/107
5,939,668 A 8/1999 De Win
5,992,802 A * 11/1999 Campbell ................ H02G 3/30 248/68.1
6,095,252 A * 8/2000 Draugelates ......... H02G 3/0412 169/58
6,259,019 B1 7/2001 Damilo et al.
6,310,295 B1 10/2001 Despard
6,486,395 B1 * 11/2002 Temblador ............... H01B 9/02 174/102 R
6,491,067 B1 12/2002 Davenport et al.
6,563,052 B2 * 5/2003 Groegl ............... H01B 11/1016 174/106 R
6,566,606 B1 5/2003 Hazy et al.
6,624,358 B2 9/2003 Krabec et al.
6,625,454 B1 * 9/2003 Rappaport ............ H04W 16/20 455/422.1
6,819,842 B1 * 11/2004 Vogel ..................... G02B 6/483 385/100
6,906,264 B1 * 6/2005 Grant, Jr. ............... H01B 7/366 174/102 D
7,045,716 B2 * 5/2006 Granheim ................ H05B 3/56 174/102 SC
7,166,802 B2 * 1/2007 Cusson .................... H01B 7/20 174/105 R
7,178,226 B2 * 2/2007 Manning ................ H02G 1/085 29/739
7,309,835 B2 12/2007 Morrison et al.
7,432,446 B2 10/2008 Orfin et al.
7,469,470 B2 12/2008 Cusson et al.
7,754,969 B2 * 7/2010 Kummer .................. H01B 7/02 174/102 D
7,880,089 B1 2/2011 Herrin
8,088,997 B2 * 1/2012 Picard .................... H01B 9/028 174/36
8,664,532 B1 3/2014 Herrin et al.
8,697,996 B2 * 4/2014 Kummer ................ H01B 13/26 174/102 D
9,396,838 B2 * 7/2016 Kummer ................ H01B 9/028
2002/0001443 A1 * 1/2002 Bringuier ............... G02B 6/441 385/113
2002/0006799 A1 * 1/2002 Rappaport ............ H04W 16/20 455/446
2004/0229623 A1 * 11/2004 Rappaport .......... G01F 23/0061 455/446
2005/0013573 A1 * 1/2005 Lochkovic ........... G02B 6/4402 385/128
2005/0036749 A1 * 2/2005 Vogel ................... H04B 10/272 385/100
2008/0011990 A1 * 1/2008 Kostet .................. G02B 6/4464 254/134
2008/0295265 A1 * 12/2008 Gorman ................ E04G 23/002 15/4
2008/0302554 A1 12/2008 Kummer et al.
2009/0145610 A1 * 6/2009 Varkey .................. E21B 47/001 166/308.1
2009/0250239 A1 * 10/2009 Picard .................... H01B 9/028 174/109
2009/0308618 A1 * 12/2009 Collie ..................... E21B 19/22 166/385
2010/0252299 A1 10/2010 Kummer et al.
2011/0081121 A1 * 4/2011 Le Dissez ............ G02B 6/4475 385/102

(56) References Cited

U.S. PATENT DOCUMENTS

| | | | | |
|---|---|---|---|---|
| 2011/0211794 A1* | 9/2011 | Ruzzier | G02B 6/449 | 385/111 |
| 2012/0063732 A1* | 3/2012 | Wu | G02B 6/4408 | 385/104 |
| 2013/0079448 A1* | 3/2013 | Biscoglio | C08K 5/06 | 524/381 |
| 2014/0000192 A1* | 1/2014 | Cramb | E04C 2/292 | 52/220.1 |
| 2015/0267034 A1* | 9/2015 | Biscoglio | C08K 3/2279 | 524/81 |

FOREIGN PATENT DOCUMENTS

| | | | | | |
|---|---|---|---|---|---|
| CN | 2181733 | Y | | 11/1994 | |
| CN | 1195359 | A | | 10/1998 | |
| CN | 2559079 | Y | | 7/2003 | |
| CN | 2632818 | Y | | 8/2004 | |
| CN | 1588564 | A | | 3/2005 | |
| CN | 103574162 | A | * | 2/2014 | E02B 17/00 |
| DE | 1 075 181 | | | 2/1960 | |
| DE | 197 19 410 | A1 | | 11/1997 | |
| EP | 0382557 | | | 9/1990 | |
| FR | 2 762 438 | | | 10/1998 | |
| GB | 351881 | | | 7/1931 | |
| JP | 54-14138 | | | 2/1979 | |
| JP | 5-28845 | | | 2/1993 | |
| JP | 6-96618 | | | 4/1994 | |
| JP | 11-232934 | | | 8/1999 | |

OTHER PUBLICATIONS

Chase Wire & Cable Materials Product Data Sheet. Chase & Sons C1024 Separator Tape, 2008, 1 page.

Chase Wire & Cable Materials Product Data Sheet. Chase & Sons C1033 Separator Tape, 2008, 1 page.

Chinese First Office Action dated Apr. 21, 2011 cited in Application No. 200880012907.2.

Chinese Office Action dated Oct. 31, 2012 cited in Application No. 200880012907.2, 5 pages.

David Johnson, Search Report, dated Apr. 13, 2005, 12 pages.

Hartwell, "Abstract: Wiring Methods for Patient Care Areas, EC & M: Electrical Construction and Maintenance," vol. 93(4), pp. 82-83, Elsevier, Inc., 2008.

International Search Report dated Sep. 10, 2008 cited in Application No. PCT/US2008/063846.

Jenks et al., "Performance of Bare Aluminum Wire as Armoring Material for Submarine Cables," IEEE Transactions on Power Apparatus and Systems, vol. 82(66), pp. 379-382, Jun. 1963.

Mexican Office Action dated Nov. 5, 2010 cited in Application No. MX/a/2009/013141.

Mexican Second Office Action dated Jul. 8, 2011 cited in Application No. MX/a/2009/013141.

Mexican Third Office Action dated Feb. 3, 2012 cited in Application No. MX/a/2009/013141, 4 pages.

National Fire Protection Association, NFPA 70 National Electrical Code, 1999 Edition, Article 100, 250, 333, 334, 517, 65 pages.

Powers, Jr., "The Basics of Power Cable, Cement Industry Technical Conference," 1994, XXXVI Conference Record, 36th IEEE, pp. 37-45, May 29-Jun. 2, 1994.

Temblador, "New Form of Type MC Cable Crosses Application Boundaries," IAEI News, pp. 83-89, Sep.-Oct. 2006.

Translation of Chinese Second Office Action dated Apr. 19, 2012 cited in Application No. 200880012907.2, 6 pages.

U.S. Office Action in U.S. Appl. No. 12/985,875 dated Mar. 27, 2013, 17 pages.

U.S. Official Action dated Oct. 13, 2009, in U.S. Appl. No. 12/139,249, filed Jun. 13, 2008, 16 pages.

Underwriters Laboratories Inc., UL 1569, Metal-Clad Cables, May 25, 2005, 58 pages.

Underwriters Laboratories Inc., UL 1569, Metal-Clad Cables, Oct. 10, 2005, 70 pages.

Underwriters Laboratories Inc., UL4, Standard for Safety, Armored Cable, Nov. 4, 1998, 35 pages.

* cited by examiner

ARMORED CABLE WITH INTEGRAL SUPPORT

REFERENCE TO RELATED APPLICATIONS

This application is a continuation application of co-pending U.S. patent application Ser. No. 14/187,596, filed on Feb. 24, 2014, now U.S. Pat. No. 9,396,838, which is a continuation of U.S. patent application Ser. No. 12/814,595, filed on Jun. 14, 2010, now U.S. Pat. No. 8,697,996, which is a continuation application of U.S. patent application Ser. No. 12/046,488, filed on Mar. 12, 2008, now U.S. Pat. No. 7,754,969, which claims the benefit of U.S. Provisional Application No. 60/942,727, filed on Jun. 8, 2007, the disclosures of which are incorporated herein by reference in their entirety.

BACKGROUND

Cable risers are used to supply power, for example, to multi-story building such as apartments or condominiums. For example, conductors may be placed in a vertical raceway and run to individual apartments. In some situations, due to gravitational forces, conductors within the vertical raceways may slip down the armor. For example, to stop this cable slippage, offsets may be used. Thus, the conventional strategy is to create horizontal offsets in the vertical raceway runs to stop slippage. This often causes problems because conventional systems create significant costs and time requirements for installing cable risers. In view of the foregoing, there is a need for methods and systems for providing vertical cable and raceways more optimally. Furthermore, there is a need for providing cable raceways with integral (i.e. built-in) support.

SUMMARY

A system for providing cable support may be provided. The system may comprise a conductor core, a filler that may provide integral core support, and armor. The conductor core may comprise at least one conductor. The filler may be applied around at least a portion of the conductor core. The armor may be applied around at least a portion of the filler. The filler may apply a strong enough force on an exterior of the conductor core configured to keep the conductor core from slipping down an interior of the filler due to a gravitational force. In addition, the filler may apply a strong enough force on an interior of the armor configured to keep a combination of the conductor core and the filler from slipping down the interior of the armor due to the gravitational force.

It is to be understood that both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
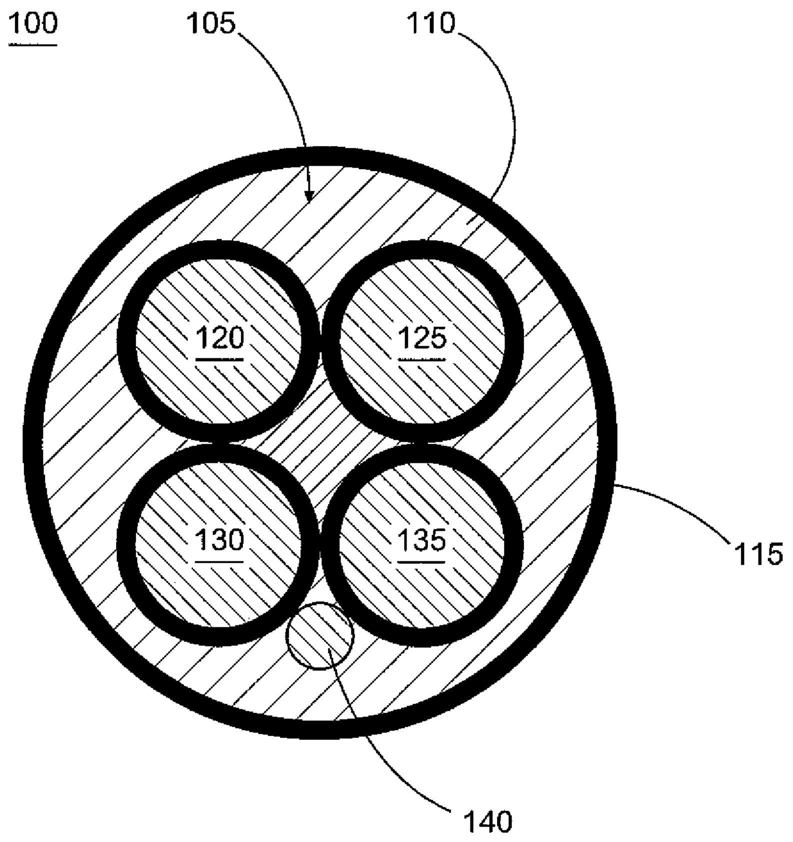
FIG. 1 is a diagram of an armored cable system with integral support.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Consistent with embodiments of the invention, an armored cable with integral support may be provided. Embodiments of the invention may eliminate conventional cable offsets in vertical raceway cable installations by providing integral support between conductors and the armor. Consequently, the integral support may keep the conductors within the armor in a vertical raceway installation from slipping down due to gravitational forces. Accordingly, embodiments of the invention may reduce cable installation time and cost.

FIG. 1 shows a diagram of an armored cable system 100 with integral support. FIG. 1 shows a cross-section of system 100, which may have a longitudinal length. As shown in FIG. 1, system 100 may include a conductor core 105, a filler 110, and an armor 115. Conductor core 105, though not so limited, may comprise a first conductor 120, a second conductor 125, a third conductor 130, a fourth conductor 135, and a ground wire 140. Fourth conductor 135 may be configured to be used as a neutral (e.g. may have an insulation color designating it as a neutral or may be of a different size than the other conductors in conductor core 105).

While as shown in FIG. 1, conductor core 105 includes four conductors and a neutral, embodiments of the invention are not so limited. For example, conductor core 105 may include any number of conductors (e.g. insulated, non-insulated, or otherwise) and may include any number of ground wires or may not include a ground wire. Any one or more of the conductors in conductor core 105 may be configured to be a neutral wire, or none of the conductors in conductor core 105 may be configured to be a neutral wire. Any one or more of the conductors or ground wire(s) in conductor core 105 may have an insulation color indicating that any one or more of the conductors or ground wire(s) in conductor core 105 is intended as a neutral(s). Furthermore, the conductors or ground wire(s) in conductor core 105 may all be the same size or they may vary individually or in any sub-combination by size. In addition, the conductors or ground wire(s) in conductor core 105 may all be made of the same material (e.g. copper, aluminum, etc.) or they may vary individually or in any sub-combination by material. Also, the conductors or ground wire(s) in conductor core 105 may all be stranded or solid or they may vary individually or in any sub-combination by being stranded or solid. Notwithstanding, conductor core 105 may comprise any conductor construction.

Filler 110 may comprise, but is not limited to, polyethylene, polyvinyl chloride (PVC), or nylon. A foaming agent, a material comprising micro-spheres, or other similar substances may be added to filler 110 before filler 110 is extruded onto conductor core 105. The foaming agent may be configured to create voids in filler 110. When filler 110 is compressed in a first direction (e.g. toward the center of system 100,) the voids (or micro-spheres) in filler 110 may tend to create an opposing force in filler 110 opposite the first direction. For example, after being extruded onto conductor core 105, filler 110 may have a "squeezing" force applied to its exterior by armor 115. With this squeezing force applied to filler 110, the voids (or micro-spheres) in filler 110 may be configured to cause filler 110 to: i) apply a strong enough force on the exterior of conductor core 105 to keep conductor core 105 from slipping down filler 110's interior due to gravitational forces on conductor core 105; and ii) apply a strong enough force on armor 115's interior to keep the combination of conductor core 105 and filler 110 from slipping down armor 115's interior due to the gravitational forces on conductor core 105 and filler 110. As stated above, micro-spheres added to the filler 110 may cause an effect similar to the voids created by the foaming agent. The micro-spheres may tend to be more evenly distributed in filler 110 than the voids.

Filler 110 may comprise, but is not limited to, a flexible PVC compound (e.g. SW1005) with 0.1% to 5% HC-01 foaming agent by weight. The foaming agent may be supplied by Bayer Corporation of 100 Bayer Road, Pittsburgh, Pa. 15205-9741. Furthermore, as stated above, micro-spheres may be combined with the flexible PVC compound instead of the foaming agent for example. The micro-spheres may comprise Expancel micro-spheres 930 MB 120 supplied by Expancel-AKZO NOBEL of 2240 Northmont Parkway, Duluth, Ga. 30096. The formulation using micro-spheres may comprise 0.5% 930 MB 120 to 99.5% SW1005 by weight. The range of Expancel micro-spheres used may vary, for example, between 0.1% and 5% by weight.

Notwithstanding, filler 110 may comprise or be augmented with any substance that (when filler 110 is squeezed) is, for example, capable of: i) applying a strong enough force on the exterior of conductor core 105 to keep conductor core 105 from sliding down filler 110's interior due to gravitational forces on conductor core 105; and ii) applying a strong enough force on the interior of armor 115 to keep the combination of conductor core 105 and filler 110 from slipping down armor 115's interior due to gravitational forces on conductor core 105 and filler 110.

Armor 115 may comprise any substance (e.g. metallic, non-metallic, electrically conductive, electrically semi-conductive, etc.) or construction capable of creating the aforementioned "squeezing" force applied to filler 110's exterior. For example, armor 115 may comprise a continuous strip having a width and being applied helically around filler 110. The continuous strip, for example, may be snuggly or tightly wrapped around filler 110. The continuous strip (e.g. metallic or non-metallic) may have a concave side facing filler 110. Concavities in the concave side may tend to be filled by portions of filler 110 when armor 115 squeezes filler 110. This concavity filling may aid filler 110 in applying the aforementioned force strong enough on the interior of the armor 115 to keep the combination of conductor core 105 and filler 110 from slipping down armor 115's interior due to gravitational forces on conductor core 105 and filler 110. Armor 115 may be, but is not limited to, welded corrugations or other assembly construction such as interlocked strip or braided stranding for example.

Consistent with embodiments of the invention, armored cable system 100 may be used in cable risers used to supply power, for example, to multi-story building such as apartments or condominiums. For example, armored cable system 100 may be placed in a substantially vertical raceway and run to individual apartments. Due to gravitational forces, conventional conductors within the vertical raceways may slip down the armor. However, consistent with embodiments of the invention, gravitational forces may not cause conductor core 105 to slip down armor 115 because armored cable system 100 may include integral support. This may be true even when armored cable system 100 (and thus conductor core 105) is in a substantial vertical altitude or position. This integral support may be created by filler 110 being "squeezed" by armor 115. With this squeezing force applied to filler 110, voids or micro-spheres in filler 110 may be configured to cause filler 110 to: i) apply a strong enough force on the exterior of conductor core 105 to keep conductor core 105 from slipping down filler 110's interior due to gravitational forces on conductor core 105; and ii) apply a strong enough force on armor 115's interior to keep the combination of conductor core 105 and filler 110 from slipping down armor 115's interior due to gravitational forces on conductor core 105 and filler 110.

Figure 2:
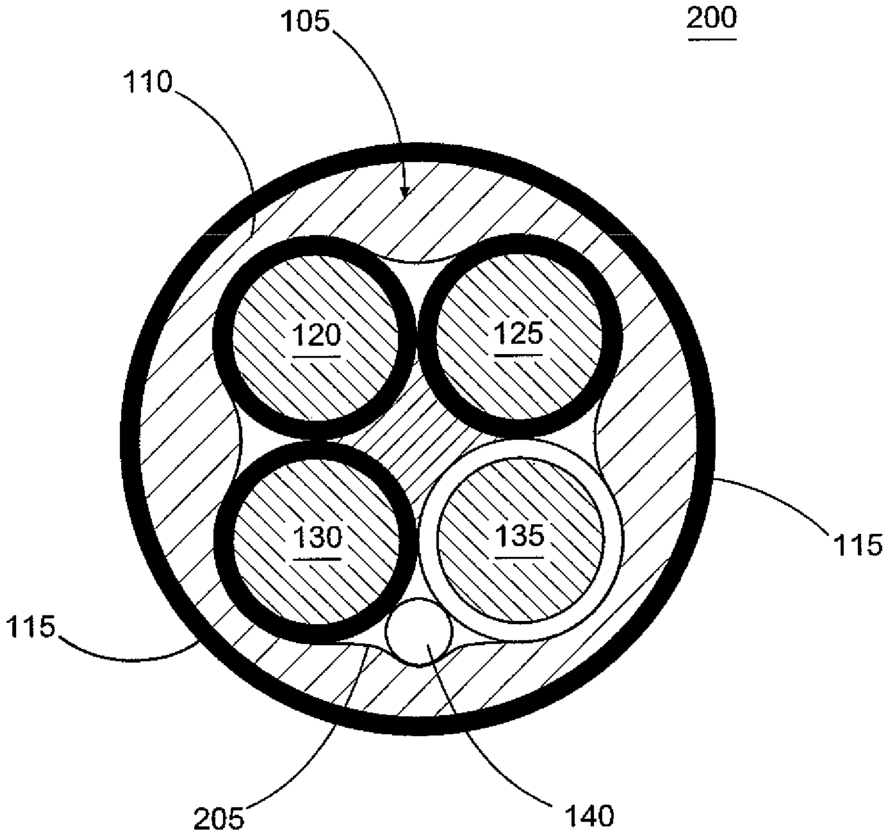
FIG. 2 is a diagram of an armored cable system with integral support and tape separator.
Figure 3:
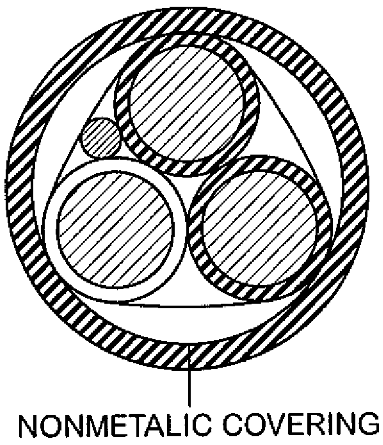
FIG. 3 is a diagram of an armored cable system using different fillers and rubber cord configurations.
Figure 4:
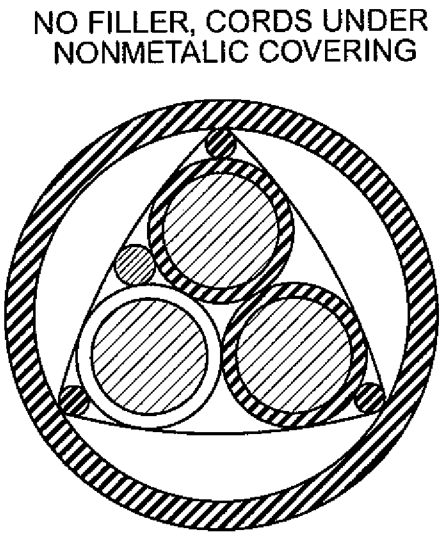
FIG. 4 is a diagram of an armored cable system using different fillers and rubber cord configurations.
Figure 5:
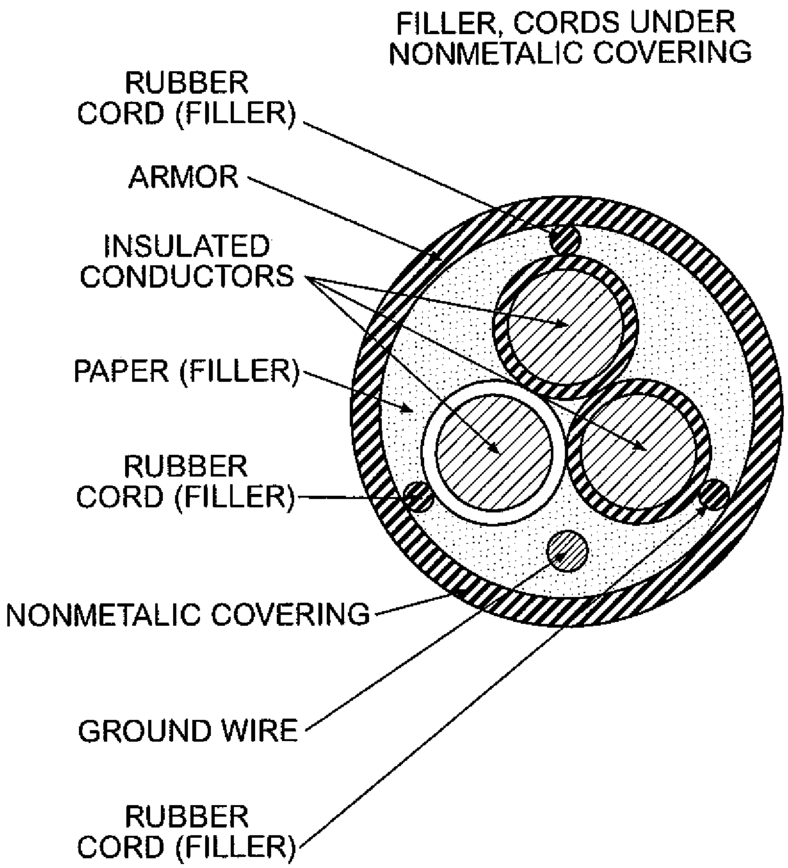
FIG. 5 is a diagram of an armored cable system using different fillers and rubber cord configurations.

FIG. 2 shows a diagram of a cable system 200 with integral support and tape separator. As shown in FIG. 2, system 200 may include the same elements of system 100 as described above; however, system 200 may include the addition of a tape separator 205. Tape separator 205 may be non-metallic. Notwithstanding tape separator 205, system 200 may be constructed and may function in ways similar to system 100. FIGS. 3 through 5 show other embodiments using different fillers and rubber cord configurations.

Figure 6:
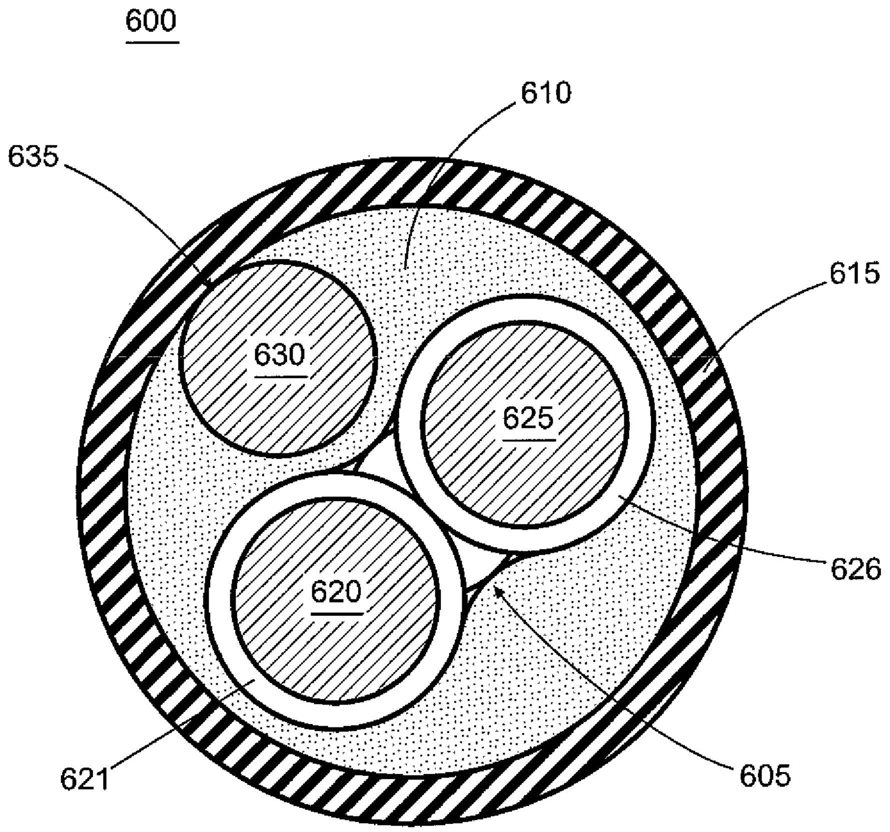
FIG. 6 is a diagram of an armored cable system with grounded armor.

FIG. 6 shows a diagram of an armored cable system 600 with grounded armor consistent with embodiments of the invention. System 600 may be used, for example, in applications where electrical codes may require a cable's armor to be well grounded such as in a medical or critical care environment. As shown in FIG. 6, system 600 may include a conductor core 605, a filler 610, an armor 615, and a ground wire 630. FIG. 6 shows a cross-section of system 600, which may have a longitudinal length. For example, ground wire 630 may be placed between filler 610 and armor 615 where ground wire 630 and armor 615 come into electrical contact at a point 635, for example, as described in more detail below.

Conductor core 605, though not so limited, may comprise a first conductor 620 and a second conductor 625. First conductor 620 and second conductor 625 may respectively include insulation layer 621 and insulation layer 626. Notwithstanding, conductor core 605 may include more or less conductors compared to the example shown in FIG. 6. In addition, system 600 may include more or less ground wires compared to the example shown in FIG. 6. Conductor core 605 may be of similar construction as conductor code 105 as described above. However, conductor core 605 may or may not include a ground wire or neutral wire. Similarly, conductor 620 and conductor 625 may be of the same construction as conductor 120 and conductor 125 respectively as described above and ground wire 630 may be of the same construction as ground wire 140 as described above. Moreover, filler 610 and armor 615 may be of similar construction to filler 110 and armor 115 respectively as described above.

Armor 615 may comprise any substance (e.g. metallic, non-metallic, electrically conductive, electrically semi-conductive, etc.) or construction capable of creating a "squeezing" force applied to filler 610's exterior. For example, armor 615 may comprise a continuous strip having a width and being applied helically around filler 610. The continuous strip, for example, may be snuggly or tightly wrapped around filler 610. The continuous strip may have a concave side facing filler 610. Concavities in the concave side facing filler 610 may tend to be filled by portions of filler 610 when armor 615 squeezes filler 610. As described in more detail below, when the aforementioned squeezing force is applied to filler 610 by armor 615, voids (or micro-spheres) in filler 610 may cause filler 610 to apply a strong enough force to ground wire 630 to create an electrical connection between ground wire 630 and armor 615 at point 635, for example.

As described above with respect to FIG. 6, filler 610 may comprise, but is not limited to, polyethylene, polyvinyl chloride (PVC), or nylon. A foaming agent or a material comprising micro-spheres may be added to filler 610 before filler 610 is extruded onto conductor core 605. (Examples of the types and amounts of foaming agent and micro-spheres are described above with respect to filler 110.) The foaming agent may be configured to create voids in filler 610. Notwithstanding, filler 610 may comprise or be augmented with any substance that may be capable of causing filler 610 to apply a strong enough force to ground wire 630 to create an electrical connection between ground wire 630 and armor 615.

Consistent with embodiments of the invention, when filler 610 is compressed (e.g. squeezed by armor 615 or otherwise compressed within armor 615) in a first direction (e.g. toward the center of system 600,) the voids (or micro-spheres) in filler 610 may tend to create an opposing force in filler 610 opposite the first direction. For example, after being extruded onto conductor core 605, filler 610 may have a squeezing force applied to its exterior by armor 615. With this squeezing force applied to filler 610 (e.g. toward the center of system 600,) the voids (or micro-spheres) in filler 610 may tend to create an opposing force in filler 610 opposite the first direction. Consequently, this opposing force may cause filler 610 to apply a strong enough force to ground wire 630 to create an electrical connection between ground wire 630 and armor 615. In other words, armor 615 may press against ground wire 630 on one side of ground wire 630 and filler 610 may press against ground wire 630 on a side opposing armor 615. Accordingly, ground wire 630 may snuggly contact armor 615 at at least point 635. Moreover, ground wire 630 may snuggly contact armor 615 at any number of points along system 600's longitudinal length and is not limited to contacting armor 615 at only point 635. In addition, ground wire 630 may contact armor 615 continuously along system 600's longitudinal length. When ground wire 630 and armor 615 are both electrically conductive (e.g. both being bare and metallic,) the aforementioned contact between ground wire 630 and armor 615 may create an electrical connection between ground wire 630 and armor 615.

Consistent with embodiments of the invention, filler 110 or filler 610 may be applied to conductor core 105 or conductor core 605 respectively in any manner and there application is not limited to extrusion. Furthermore, forces caused by filler 110 or filler 610 are not limited to being created by applying armor 115 or armor 615 to squeeze filler 110 or filler 610 respectively. These forces created in filler 110 or filler 610 may be created in any way. In addition, filler 110 and filler 610 may respectively electrically insulate conductor core 105 and conductor core 605 from armor 115 and armor 615. Furthermore, the construction of system 100 or system 600 is not limited to any sequence and the elements that make up system 100 or system 600 can be applied in any sequence.

While certain embodiments of the invention have been described, other embodiments may exist. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method of supplying power, the method comprising:

installing an armored cable in a substantial vertical position without the use of a horizontal offset, wherein the armored cable comprises:

(a) a conductor core;

(b) an integral support, wherein the integral support contains voids or microspheres which apply a first force on the exterior of the conductor core, and a second force on the interior of the metallic armor layer, and the integral support does not contain a tensile member; and (c) a metallic armor layer;

wherein the integral support is configured to prevent the conductor core from slipping within the metallic armor layer due to a gravitational force when the armored cable is installed in the substantial vertical position;

the integral support applying the first force, wherein the first force is greater than a gravitational force on the conductor core; and the integral support applying the second force, wherein the second force is greater than a gravitational force on the conductor core and the integral support.

2. The method of claim 1, wherein the conductor core comprises at least three conductors.

3. The method of claim 2, wherein the conductor core further comprises a ground wire.

4. The method of claim 1, wherein the armored cable further comprises a tape separator around the conductor core.

5. The method of claim 1, wherein the integral support comprises polyethylene, polyvinyl chloride (PVC), or nylon between the conductor core and the armor layer.

6. The method of claim 5, wherein the integral support further comprises microspheres dispersed throughout the integral support.

7. The method of claim 5, wherein the integral support comprises voids created by a foaming agent.

8. The method of claim 1, wherein the armor layer is helically wound around the integral support.

9. The method of claim 8, wherein the outer surface of the integral support is substantially round prior to application of the armor layer.

10. The method of claim 1, wherein the armored cable is free of a jacket on the exterior of the armor layer.

11. The method of claim 1, wherein the armor layer comprises a concave side facing the integral support, and portions of the integral support fill concavities created by the concave side.

12. The method of claim 1, wherein the armored cable further comprises a ground wire between the integral support and the metallic armor layer.

* * * * *